(12) United States Patent
Yu

(10) Patent No.: US 6,998,168 B2
(45) Date of Patent: Feb. 14, 2006

(54) ADHESIVE SECURITY TAPE

(76) Inventor: Nick Yu, 15-159, Lin 4, Kuoling Li, Chungli City, Taoyuan Hsien (TW)

( * ) Notice: Subject to any disclaimer, the term of this patent is extended or adjusted under 35 U.S.C. 154(b) by 163 days.

(21) Appl. No.: 10/773,485

(22) Filed: Feb. 6, 2004

(65) Prior Publication Data

US 2005/0175823 A1    Aug. 11, 2005

(51) Int. Cl.
*B32B 3/10*    (2006.01)

(52) U.S. Cl. .................... 428/202; 428/916; 428/203; 428/354; 283/103

(58) Field of Classification Search ............... 428/202, 428/203, 354, 916; 283/103
See application file for complete search history.

(56) References Cited

U.S. PATENT DOCUMENTS 6,413,605 B1 *   7/2002   Hoffer ....................... 428/40.1

* cited by examiner

*Primary Examiner*—Alexander S. Thomas
(74) *Attorney, Agent, or Firm*—Alan D. Kamrath; Nikolai & Mersereau, P.A.

(57) ABSTRACT

An adhesive security tape (10) includes a base layer (11) and a first adhesive layer (16) is located on a top of the base layer. A first resin layer (17) is coated to an underside of the base layer and a message layer (12) is located on an underside of the first resin layer. A second resin layer (18) is filled in gaps between protrusions on an underside of the message layer. A color layer (13) is coated on an underside of the second resin layer. An adhesive film (14) is located on an underside of the color layer. A second adhesive layer (15) is located on an underside of the adhesive film. The tape has an even color before it is peeled and a clear message is left on the tape after the tape is peeled.

2 Claims, 5 Drawing Sheets

ADHESIVE SECURITY TAPE

FIELD OF THE INVENTION

The present invention relates to an adhesive security tape including a message layer, which would be remained on the package if the tape is tried to be peeled off.

BACKGROUND OF THE INVENTION

A conventional adhesive security tape 40 is disclosed in FIG. 7 and generally includes a base layer 41 with a message layer 42 on its underside and a color layer 43 is filled in the gaps 421 of the protrusions of the message layer 42. An adhesive film 44 is coated to an underside of the color layer 43 and an adhesive layer 45 is coated to the underside of the adhesive film 44. Referring to FIG. 8, if an unauthorized peeling is proceeding to peel the tape 40 on a package 50 as shown in FIG. 10, the message is remained on the surface of the package 50 as shown in FIGS. 9 and 11 and on the base layer 41 as shown in FIG. 12.

Nevertheless, the message layer 42 is involved in an inherent problem, which is that the thickness of the message layer 42 is not evenly thick. Before the, tape 40 is peeled, the message layer 42 has chromatic aberration, especially for the message layer 42 made by releasing agent. This makes the message to be visible even before the tape is peeled. Besides, the conventional adhesive security tape has only one adhesive side.

The present utility model intends to provide an adhesive security tape that has an even color before it is peeled, and an obvious message is remained after the tape is peeled.

SUMMARY OF THE INVENTION

The present invention relates to an adhesive security tape that has two adhesive layers on a top surface and an underside surface. The tape includes several layers and the adhesive between the layers are different so that when the tape is peeled, a clear message layer is left on the object on which the tape is put. The tape has an even color before the tape is peeled.

The present invention will become more obvious from the following description when taken in connection with the accompanying drawings.

DETAILED DESCRIPTION OF THE PREFERRED EMBODIMENT

Figure 1:
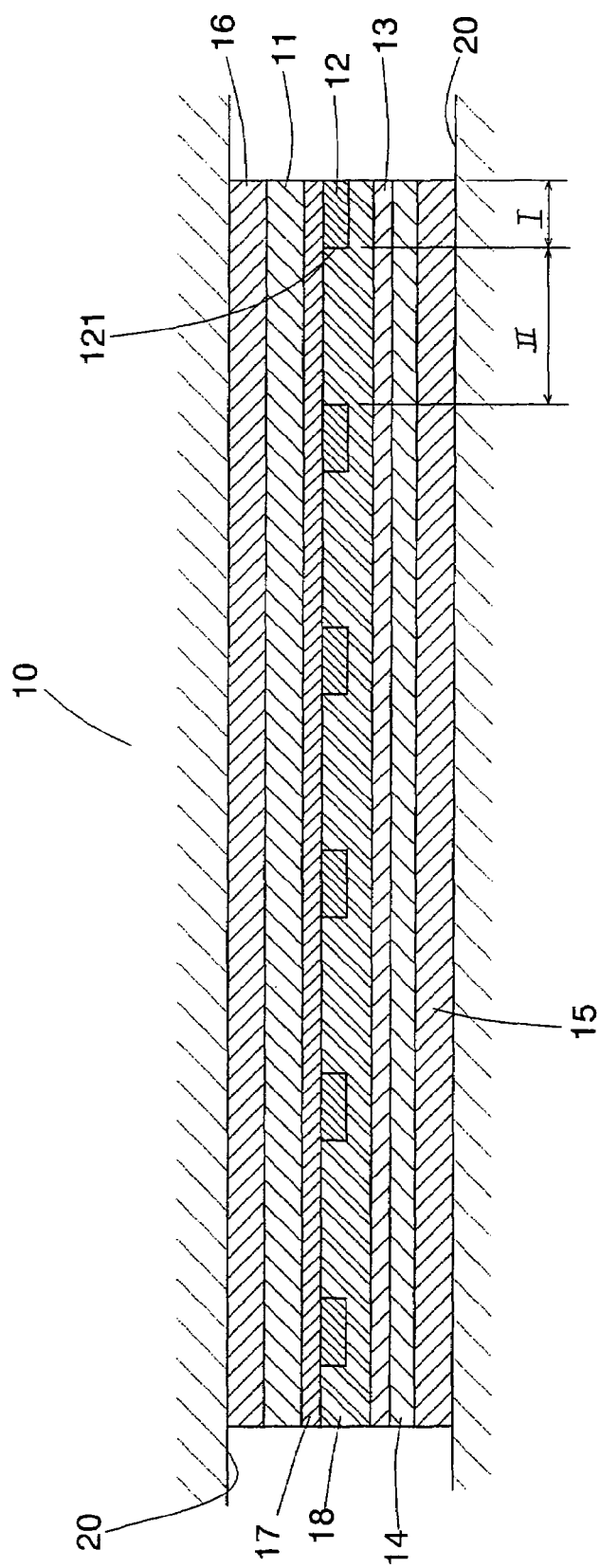
FIG. 1 is a cross sectional view to show the adhesive security tape of the present utility model.
Figure 2:
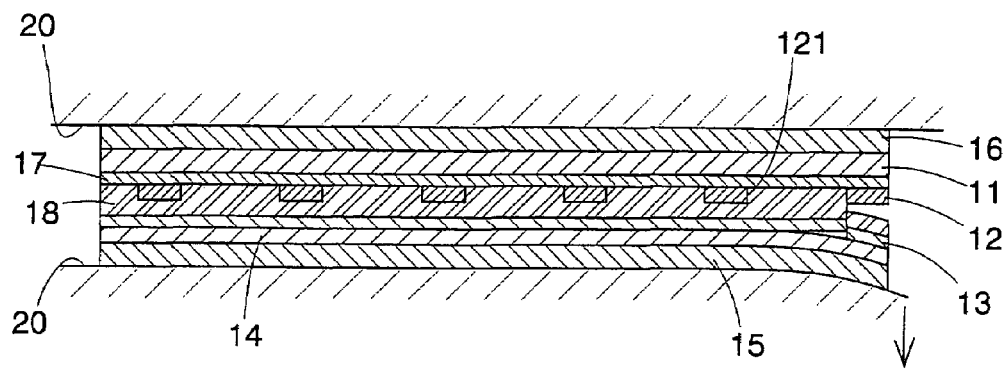
FIG. 2 is a cross sectional view to show that the tape starts to peel.

Referring to FIGS. 1 and 2, the adhesive security tape 10 of the present utility model comprises a base layer 11 and a first adhesive layer 16 is located on a top of the base layer 11. A first resin layer 17 is coated to an underside of the base layer 11 and a message layer 12 made of releasing agent is located on an underside of the first resin layer 17. A second resin layer 18 composed of transparent resin or translucent resin is filled in gaps between protrusions on an underside of the message layer 12 and a color layer 13 is coated on an underside of the second resin layer 18. An adhesive film 14 is located on an underside of the color layer 13 and a second adhesive layer 15 is located on an underside of the adhesive film 14.

The message layer 12 including the protrusions is defined as zone I and the gaps between the protrusions on the message layer 12 is defined as zone II. The zone I including the following features:

1. An adhesion for the first adhesive layer 16 to the base layer 11 is larger than an adhesion for the base layer 11 to the first resin layer 17.

2. An adhesion for the base layer 11 to the first resin layer 17 is larger than an adhesion for the first resin layer 17 to the message layer 12.

3. An adhesion for the first resin layer 17 to the message layer 12 is larger than an adhesion for the message layer 12 to the second resin layer 18.

4. An adhesion for the second adhesive layer 15 to the adhesive film 14 is larger than an adhesion for the adhesive film 14 to the color layer 13.

5. An adhesion for the adhesive film 14 to the color layer 13 is larger than an adhesion for the color layer 13 to the second resin layer 18.

6. An adhesion for the color layer 13 to the second resin layer 18 is larger than an adhesion for the second resin layer 18 to the message layer 12.

The zone II includes the following features:

1. An adhesion for the first adhesive layer 16 to the base layer 11 is larger than an adhesion for the base layer 11 to the first resin layer 17.

2. An adhesion for the base layer 11 to the first resin layer 17 is larger than an adhesion for the first resin layer 17 to the second resin layer 18.

3. An adhesion for the first resin layer 17 to the second resin layer 18 is larger than an adhesion for the second resin layer 18 to the message layer 12.

4. An adhesion for the second resin layer 18 to the color layer 13 is larger than an adhesion for the color layer 13 to the adhesive film 14.

5. An adhesion for the first resin layer 17 to the second resin layer. 18 is larger than an adhesion for the second resin layer 18 to the message layer 12.

6. An adhesion for the second resin layer 18 to the color layer 13 is larger than an adhesion for the second resin layer 18 to the message layer 12.

7. An adhesion for the second adhesive layer 15 to the adhesive film 14 is larger than an adhesion for the adhesive film 14 to the color layer 13.

Figure 4:
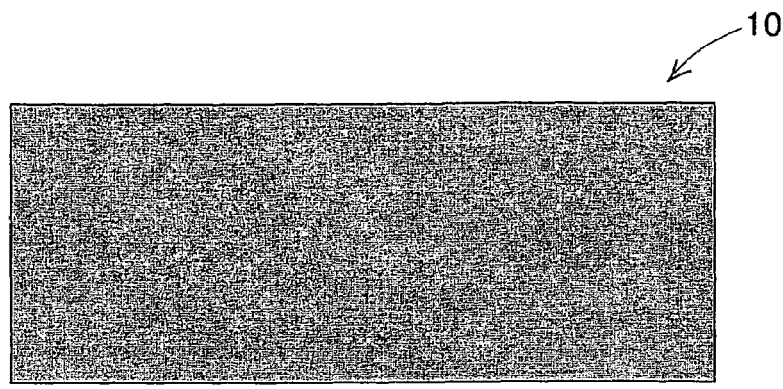
FIG. 4 shows that the tape is put on the object.
Figure 5:
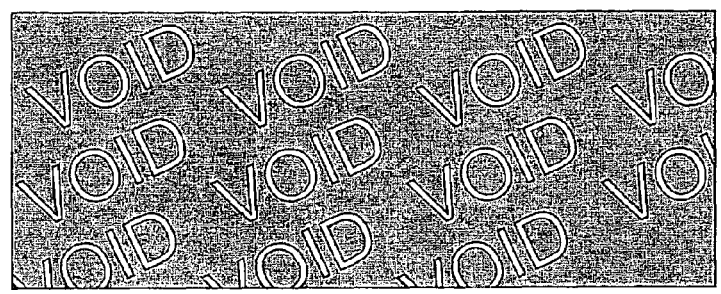
FIG. 5 shows the message layer is left on the object.
Figure 6:
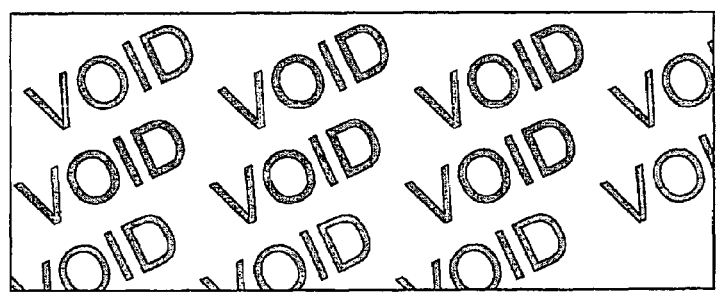
FIG. 6 shows the message left on the base layer.
Figure 7:
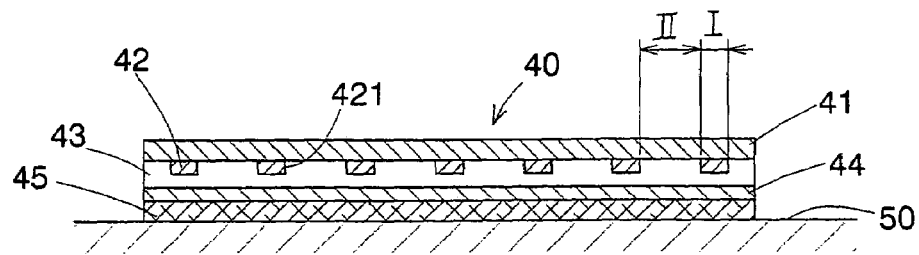
FIG. 7 is a cross sectional view to show a conventional security tape.
Figure 8:
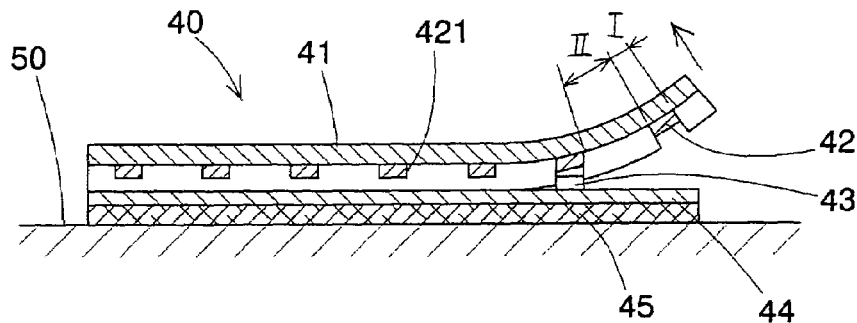
FIG. 8 is a cross sectional view to show that the conventional tape starts to peel.
Figure 9:
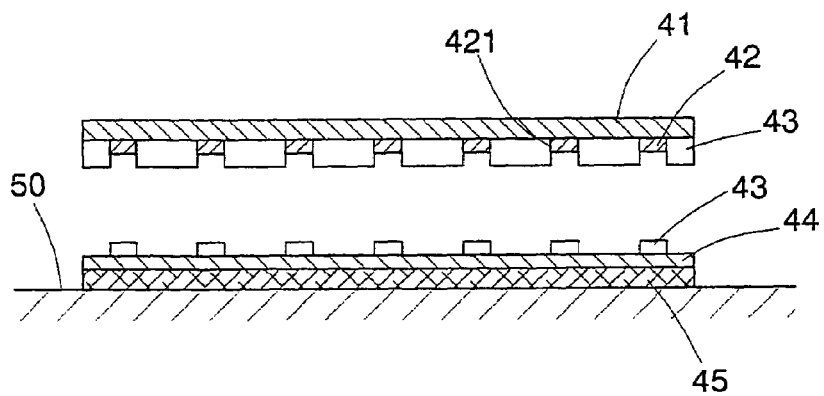
FIG. 9 shows that the conventional tape is peeled.
Figure 10:
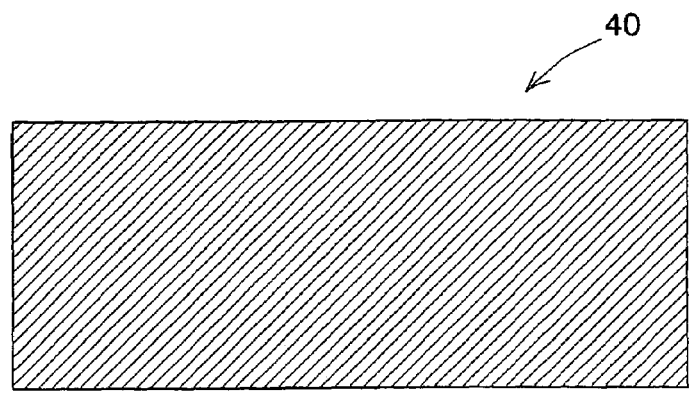
FIG. 10 shows a top view of the conventional tape.
Figure 11:
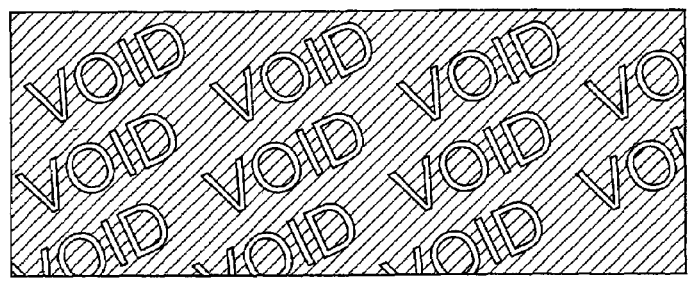
FIG. 11 shows the message layer of the conventional tape is left on the object.
Figure 12:
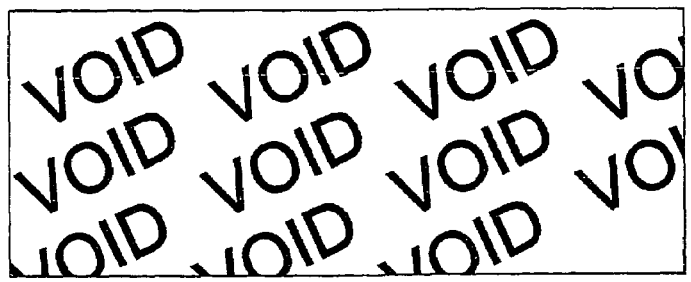
FIG. 12 shows the message left on the base layer of the conventional tape.

When the tape 10 is used on an object, it looks like the disclosure in FIG. 4 and the first adhesive layer 16 and the second adhesive layer 15 can be used to adhere onto two surfaces 20. Due to the color layer 13 in the I zone and II zone has the same thick, the tape 10 has an even color as shown in FIG. 4. When the user peels the one of the surfaces 20, the color layer 13 and the second resin layer 18 accompany the second adhesive layer 15 to be separated from the rest of the layers, and the color layer 13 on the adhesive film 14 displays: the message such as "VOID" as shown in FIG. 5. The base layer 11 and the first adhesive layer 16 are still on the surface 20. On the base layer 11 that is peeled off, there are "VOID" as shown in FIG. 6.

Figure 3:
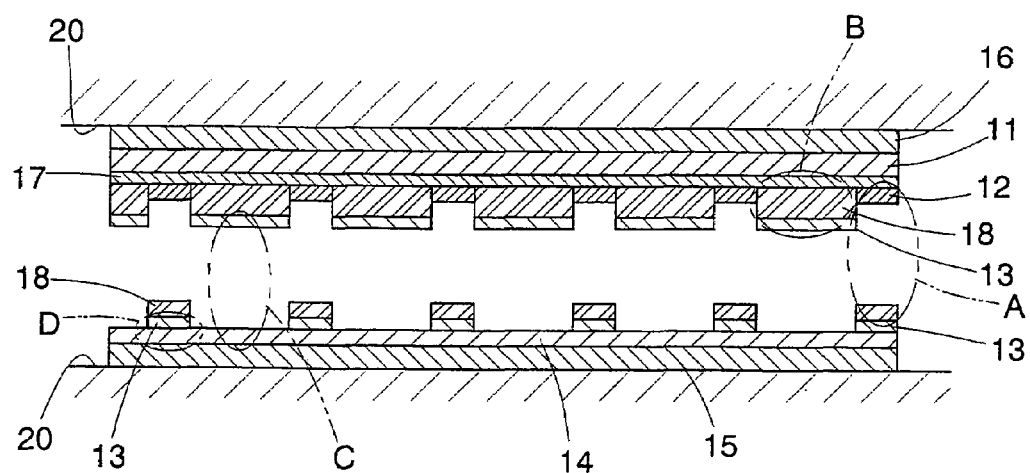
FIG. 3 shows the tape is peeled off and the message layer is seen.

As shown in FIG. 3, after the tape 10 is peeled off, the tape 10 includes two parts which are the base layer 11 and the adhesive film 14. If the user wants to re-adhere the two parts, there are the following features:

1. The first resin layer 17 is a translucent resin and the message layer 12 is not tightly secured to the second resin layer 18 as shown in the portion "A" in FIG. 3, so that the color is light. The second resin layer 18 filled in the gaps 121 of the protrusions of the message layer 12 is secured to the color layer 13 as shown in the portion "B" in FIG. 3, so that it has a dark color. By this difference, it is obvious if the two parts of the tape 10 are re-adhered again.
2. The adhesive film 14 is a translucent film and the color layer 13 and the adhesive film 14 are not tightly secured as shown in the portion "C" in FIG. 3, so that it has light color. The color layer 13 on the underside of the message layer 12 and the adhesive film 14 are tightly secured as shown the portion "D" in FIG. 3, so that it has dark color. By this difference, it is obvious if the two parts of the tape 10 are re-adhered again.

By the features, the unauthorized open of the object or package by trying re-adhering the two parts of the tape 10 is not possible.

While we have shown and described the embodiment in accordance with the present utility model, it should be clear to those skilled in the art that further embodiments may be made without departing from the scope of the present utility model.

What is claimed is:

1. A double-sided adhesive security tape comprising:
a base layer and a first adhesive layer on a top of the base layer, a first resin layer coated to an underside of the base layer, a message layer located on an underside of the first resin layer, a second resin layer filled in gaps between protrusions on an underside of the message layer, a color layer coated on an underside of the second resin layer, an adhesive film located on an underside of the color layer, a second adhesive layer located on an underside of the adhesive film;
the message layer including the protrusions being defined as zone I, and the gaps between the protrusions on the message layer being defined as zone II, the zone I including the following features:
an adhesion for the first adhesive layer to the base layer being larger than an adhesion for the base layer to the first resin layer;
an adhesion for the base layer to the first resin layer being larger than an adhesion for the first resin layer to the message layer;
an adhesion for the first resin layer to the message layer being larger than an adhesion for the message layer to the second resin layer;
an adhesion for the second adhesive layer to the adhesive film being larger than an adhesion for the adhesive film to the color layer;
an adhesion for the adhesive film to the color layer being larger than an adhesion for the color layer to the second resin layer;
an adhesion for the color layer to the second resin layer being larger than an adhesion for the second resin layer to the message layer;
the zone II including the following features:
an adhesion for the first adhesive layer to the base layer being larger than an adhesion for the base layer to the first resin layer;
an adhesion for the base layer to the first resin layer being larger than an adhesion for the first resin layer to the second resin layer;
an adhesion for the first resin layer to the second resin layer being larger than an adhesion for the second resin layer to the message layer;
an adhesion for the second resin layer to the color layer being larger than an adhesion for the color layer to the adhesive film;
an adhesion for the first resin layer to the second resin layer being larger than an adhesion for the second resin layer to the message layer;
an adhesion for the second resin layer to the color layer being larger than an adhesion for the second resin layer to the message layer, and
an adhesion for the second adhesive layer to the adhesive film being larger than an adhesion for the adhesive film to the color layer.

2. The tape as claimed in claim 1, wherein the second resin layer is composed of transparent resin or translucent resin.

* * * * *